United States Patent
Rutschmann et al.

(10) Patent No.: US 10,196,967 B2
(45) Date of Patent: Feb. 5, 2019

(54) SUPERCHARGING DEVICE FOR AN INTERNAL COMBUSTION ENGINE

(71) Applicant: Dr. Ing. h.c. F. Porsche Aktiengesellschaft, Stuttgart (DE)

(72) Inventors: Erwin Rutschmann, Tiefenbronn (DE); Peter Rothenberger, Philippsburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 178 days.

(21) Appl. No.: 15/057,550

(22) Filed: Mar. 1, 2016

(65) Prior Publication Data

US 2016/0258348 A1 Sep. 8, 2016

(30) Foreign Application Priority Data

Mar. 6, 2015 (DE) .................. 10 2015 103 353

(51) Int. Cl.
| | |
|---|---|
| *F02B 33/44* | (2006.01) |
| *F02B 33/00* | (2006.01) |
| *F02B 29/04* | (2006.01) |
| *F02B 37/04* | (2006.01) |
| *F02B 39/10* | (2006.01) |
| *F02M 35/10* | (2006.01) |

(52) U.S. Cl.
CPC .......... *F02B 37/04* (2013.01); *F02B 29/0412* (2013.01); *F02B 29/0475* (2013.01); *F02B 33/44* (2013.01); *F02B 39/10* (2013.01); *F02M 35/10255* (2013.01); *Y02T 10/144* (2013.01); *Y02T 10/146* (2013.01)

(58) Field of Classification Search
CPC .. F02B 29/0412; F02B 29/0475; F02B 33/44; F02B 37/04; F02B 39/10; F02M 35/10255; Y02T 10/144; Y02T 10/146
USPC ... 60/602, 605.2, 599, 605.1, 608, 611–612; 123/562, 563, 565
See application file for complete search history.

(56) References Cited

U.S. PATENT DOCUMENTS

| | | | | |
|---|---|---|---|---|
| 5,335,500 | A | * | 8/1994 | Wunderlich ............ F02B 37/04 123/561 |
| 6,062,026 | A | | 5/2000 | Woollenweber et al. |

(Continued)

FOREIGN PATENT DOCUMENTS

| | | |
|---|---|---|
| CH | 632 559 | 10/1982 |
| DE | 10 2007 033 175 | 1/2009 |

(Continued)

OTHER PUBLICATIONS

International Search Report dated Jan. 28, 2016.

*Primary Examiner* — Thai Ba Trieu
*Assistant Examiner* — Dapinder Singh
(74) *Attorney, Agent, or Firm* — Gerald E. Hespos; Michael J. Porco; Matthew T. Hespos

(57) ABSTRACT

A supercharging device is provided for an internal combustion engine that has at least one exhaust gas turbocharger (1, 2) and at least one charge air cooler (LLK) arranged in the outflow of the exhaust gas turbocharger (1, 2). An additional electrically driven compressor (e-booster 6, 7) is arranged downstream of the charge air cooler (LLK) in a bypass (5) to the main flow line (3) to the throttle valve (4) of the internal combustion engine. The main flow line (3) can be closed by a check valve (9) that acts in the direction of a return flow.

3 Claims, 2 Drawing Sheets

(56) References Cited

U.S. PATENT DOCUMENTS

| | | | |
|---|---|---|---|
| 6,279,550 B1 * | 8/2001 | Bryant | F01B 7/12 |
| | | | 123/316 |
| 6,938,420 B2 * | 9/2005 | Kawamura | F02B 33/34 |
| | | | 123/562 |
| 2010/0132355 A1 | 6/2010 | Michels et al. | |
| 2013/0008161 A1 | 1/2013 | Flohr | |
| 2015/0315960 A1 | 11/2015 | Thomas et al. | |

FOREIGN PATENT DOCUMENTS

| | | |
|---|---|---|
| DE | 10 2009 026 469 | 12/2010 |
| DE | 10 2010 007 601 | 8/2011 |
| DE | 20 2011 110 100 | 1/2013 |
| DE | 10 2012 005 225 | 9/2013 |
| JP | 2006-170060 | 6/2006 |
| JP | 2007-127070 | 5/2007 |
| WO | 2005/068803 | 7/2005 |
| WO | 2014/083248 | 6/2014 |

* cited by examiner

SUPERCHARGING DEVICE FOR AN INTERNAL COMBUSTION ENGINE

CROSS REFERENCE TO RELATED APPLICATION

This application claims priority under 35 USC 119 to German Patent Appl. No. 10 2015 103 353.4 filed on Mar. 6, 2015, the entire disclosure of which is incorporated herein by reference.

BACKGROUND

1. Field of the Invention. The invention relates to a supercharging device for an internal combustion engine having at least one exhaust gas turbocharger, at least one charge air cooler arranged in the outflow of the exhaust gas turbocharger, and an additional compressor (e-booster) that can be driven electrically.

2. Description of the Related Art. The so-called "downsizing" of internal combustion engines to reduce the $CO_2$ emissions with the simultaneous demand for an ever higher engine power output complicates measures necessary for improving the response behavior of internal combustion engines, particularly at low engine speeds. Starting weaknesses and weaknesses in acceleration behavior can be reduced or avoided with a supercharging device. In particular, an exhaust gas turbocharger requires a certain exhaust gas quantity to build up charge pressure. That exhaust gas quantity, however, is available only when relatively high engine speeds are reached or when a relatively high engine power output is available. Various approaches are known to reduce such weaknesses in supercharged internal combustion engines as compared with naturally aspirated engines.

DE 10 2009 026 469 A1 proposes to connect an e-booster as an additional high-pressure compressor in series with the compressor part of the low pressure supercharging device and to introduce additional air compressed via a compressed air reservoir into the combustion chambers of the internal combustion engine via a switching valve in order to overcome the starting phase.

DE 10 2012 005 225 A1 discloses an arrangement of an e-booster in a parallel line of the compressed air to the intake manifold with an annular configuration of the flow opening for the air flow from the e-booster into the intake manifold.

Further e-boosters are disclosed in U.S. Pat. No. 6,062,026, CH 632 559 and JP 2006 170 060 A.

The invention is based on the object of providing a particularly simple construction of a supercharging device for internal combustion engines that avoids the weaknesses of the known systems and can effectively assist the main supercharging device over the entire range in which additional supercharging is desirable.

SUMMARY

The invention arranges an e-booster downstream of the charge air cooler in a bypass to the main flow line to the throttle valve of the internal combustion engine. The main flow line can be closed by a check valve that acts in the direction of a return flow.

The supercharging device of the invention is particularly advantageous and effective when a charge air cooler is arranged in the outflow of the e-booster upstream of the feed of the additionally compressed combustion air into the main flow line to the throttle valve.

The bypass line may branch off the main flow line and the check valve for the e-booster may be arranged in the bypass line in those embodiments where there is more than one exhaust gas turbocharger or a charge air cooler that is connected downstream of the exhaust gas turbocharger.

The check valve that prevents a return flow of the charge air in the direction of the exhaust gas turbocharger is dimensioned to open only in the case of a sufficiently high charge air pressure being generated by the exhaust gas turbocharger or exhaust gas turbochargers.

The drawings diagrammatically show the construction of a supercharging device according to the invention. The features and details of the invention are to be explained in greater detail in the following text using said drawing.

DETAILED DESCRIPTION

Figure 1:
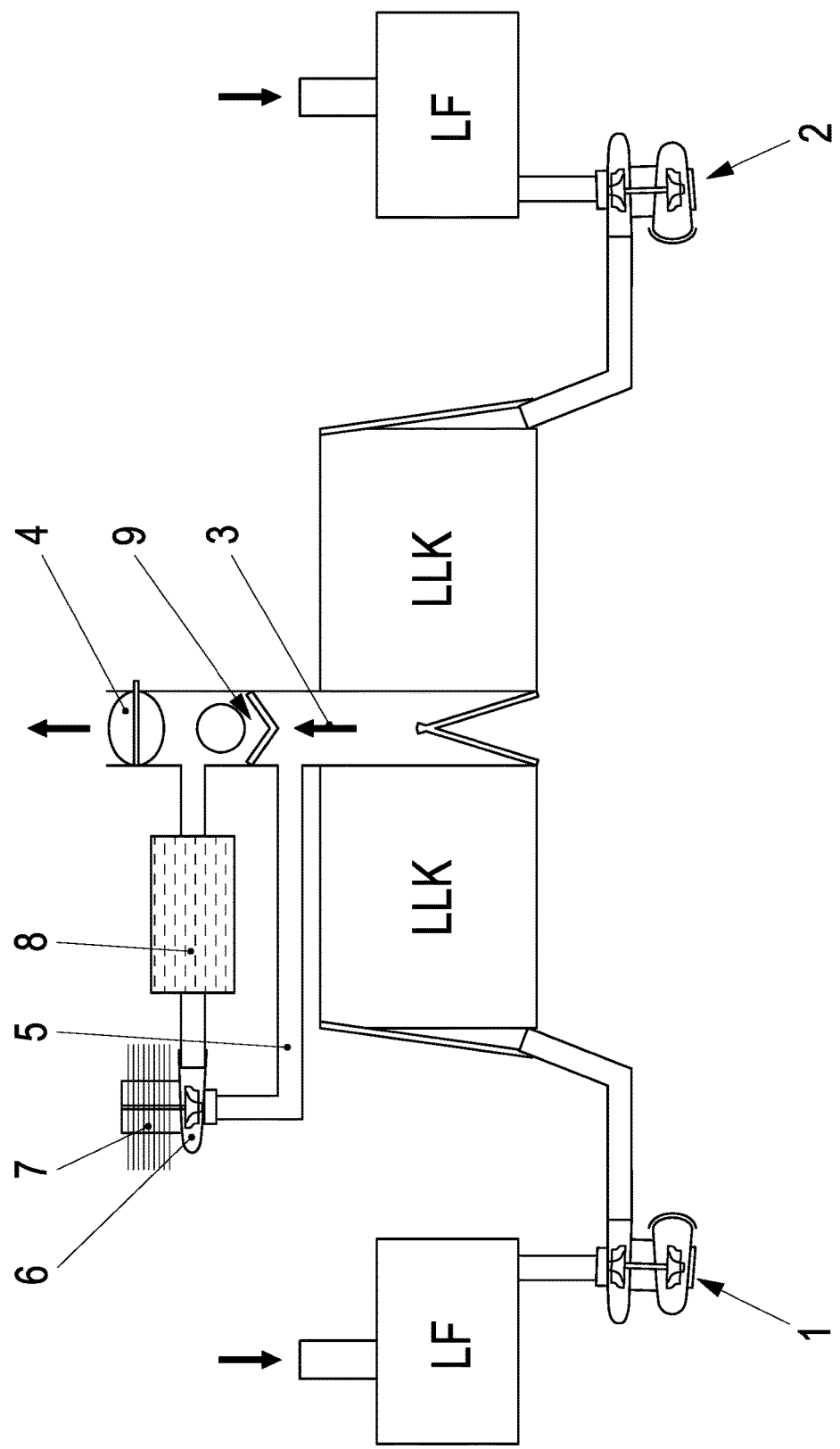
FIG. 1 shows the supercharging device according to the invention in the normal operating state with an open check valve in the main flow line and with a switched-off e-booster in a bypass line.
Figure 2:
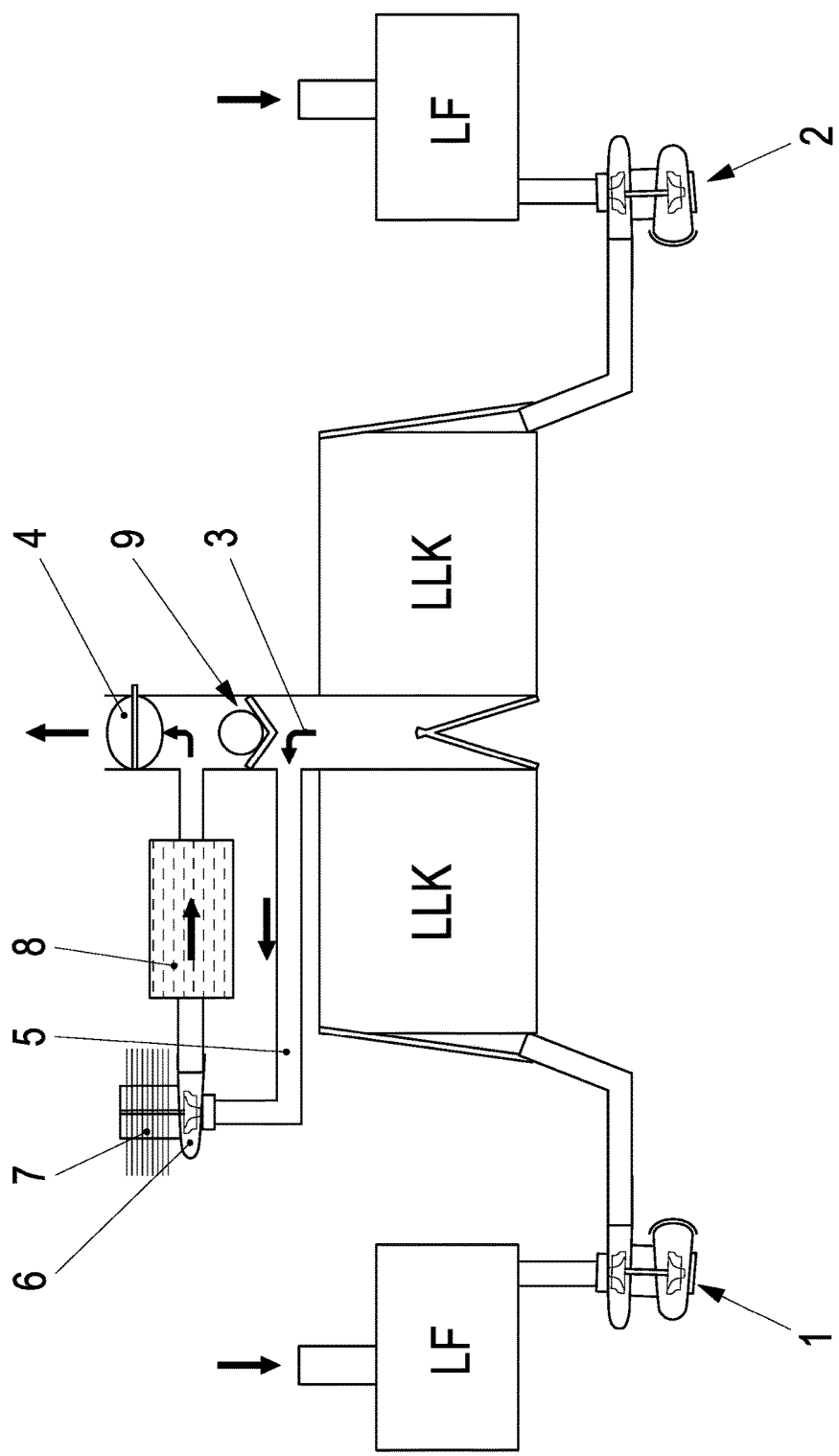
FIG. 2 shows a supercharging device according to the invention with two exhaust gas turbochargers and with a closed check valve in the main flow line and a correspondingly switched-on compressor (e-booster) in the bypass line.

Exhaust gas turbochargers 1 and 2 are fed exhaust gas and additional air, respectively, for example via an air filter from, for example, two cylinder banks in the exemplary embodiment. The air that is compressed and heated by way of the compression operation is fed to charge air coolers LLK for cooling and via the charge air coolers LLK of the main flow line 3 to the throttle valve 4 for feeding into the combustion chambers (not shown) of an internal combustion engine. A further compressor 6 is arranged in a bypass line 5 to the main flow line 3. The further compressor 6 can be driven electrically via an electric motor 7. The compressor 6 or its electric motor 7 are called an e-booster according to the invention and in this exemplary embodiment. High compression performance is made available directly in the e-booster 6, 7 due to the drive by the electric motor. The air that additionally is compressed highly in this way is fed in a highly charged state via a charge air cooler 8 into the main flow line 3 upstream of the throttle valve 4 and is fed to the combustion chambers of the internal combustion engine.

A check valve 9 is in the main flow line 3 and is open in the normal operating state of the internal combustion engine. As a result, the entire charge air flow can flow via the main flow line 3 to the throttle valve. However, the check valve 9 is arranged to shut the main flow line 3 in the direction of the return flow charge air cooler LLK or exhaust gas turbocharger 1, 2 during normal operation.

The check valve 9 shuts the main flow line 3 if a sufficiently high charge air pressure is not made available by way of the exhaust gas turbochargers 1, 2. Thus, the charge air that is not compressed sufficiently is guided via the bypass 5 in the e-booster 6, 7 that then is set in operation for high compression. The charge air then is fed via the charge air cooler 8 that is assigned to said e-booster 6, 7 upstream of the throttle valve 4 into the main flow line 3. The check valve 9 remains closed via the charge pressure that is generated by the e-booster 6, 7 until sufficiently high charge pressure can be built up by way of the exhaust gas turbochargers 1, 2. Additionally, the check valve 9 is pressed open in the direction of opening the main flow line 3 toward the throttle valve 4. From this time, the e-booster 6, 7 can be switched off, and the charge air flows exclusively via the main flow line 3 to the throttle valve 4.

If the charge pressure drops below the charge pressure which can be generated by the e-booster 6, 7 in corresponding load or engine speed ranges, the e-booster 6, 7 can be switched on again. Accordingly, the check valve 9 in the main flow line 3 is pressed closed again and guides the charge air from the exhaust gas turbochargers 1 and 2 via the bypass line 5 to the e-booster 6, 7 for additional supercharging.

LIST OF DESIGNATIONS

1, 2 Exhaust gas turbocharger
3 Main flow line
4 Throttle valve
5 Bypass line
6 Compressor {e-booster}
7 Electric motor {e-booster}
8 Charge air cooler of the e-booster 6, 7
9 Check valve
LF Air filter
LLK Charge air cooler

What is claimed is:

1. A supercharging device for an internal combustion engine comprising: at least one exhaust gas turbocharger with an outflow, at least one charge air cooler arranged in the outflow of the exhaust gas turbocharger, a main flow line extending from the at least one charge air cooler to the internal combustion engine, a throttle valve in the main flow line to the internal combustion engine, a check valve in the main flow line between the at least one charge air cooler and the throttle valve, the check valve being configured to close the main flow line if charge air pressure from the at least one charge air cooler is below a specified level and an e-booster that includes a compressor and an electric motor to drive the compressor electrically, the e-booster being arranged in a bypass that extends from the main flow line at a position downstream of the at least one charge air cooler and upstream of the check valve, a further charge air cooler incorporated into the bypass downstream of the e-booster to deliver cold air to the main flow line at a position downstream of the check valve and upstream of the throttle valve of the internal combustion engine, wherein the main flow line is closed by the check valve if charge air pressure from the at least one charge air cooler is below the specified level while permitting a flow of cold air from the e-booster to the throttle valve and preventing a return flow toward the at least one exhaust gas turbocharger.

2. The supercharging device of claim 1, wherein the at least one exhaust gas turbocharger is a first exhaust gas turbocharger, the supercharging device further comprising at least a second exhaust gas turbocharger or charge air cooler connected downstream of the first exhaust gas turbocharger, the supercharged air being fed to a main flow line, in which the check valve is arranged and from which the bypass to the e-booster branches off.

3. The supercharging device of claim 1, wherein the check valve that prevents the return flow of the charge air in the direction of the at least one exhaust gas turbocharger is dimensioned to open only if a sufficiently high charge pressure is generated by the at least one exhaust gas turbocharger.

\* \* \* \* \*